Feb. 2, 1937.  R. L. LEADBETTER  2,069,413
SOUND AND VIBRATION DAMPING CONSTRUCTION
Filed Dec. 6, 1935  3 Sheets-Sheet 1
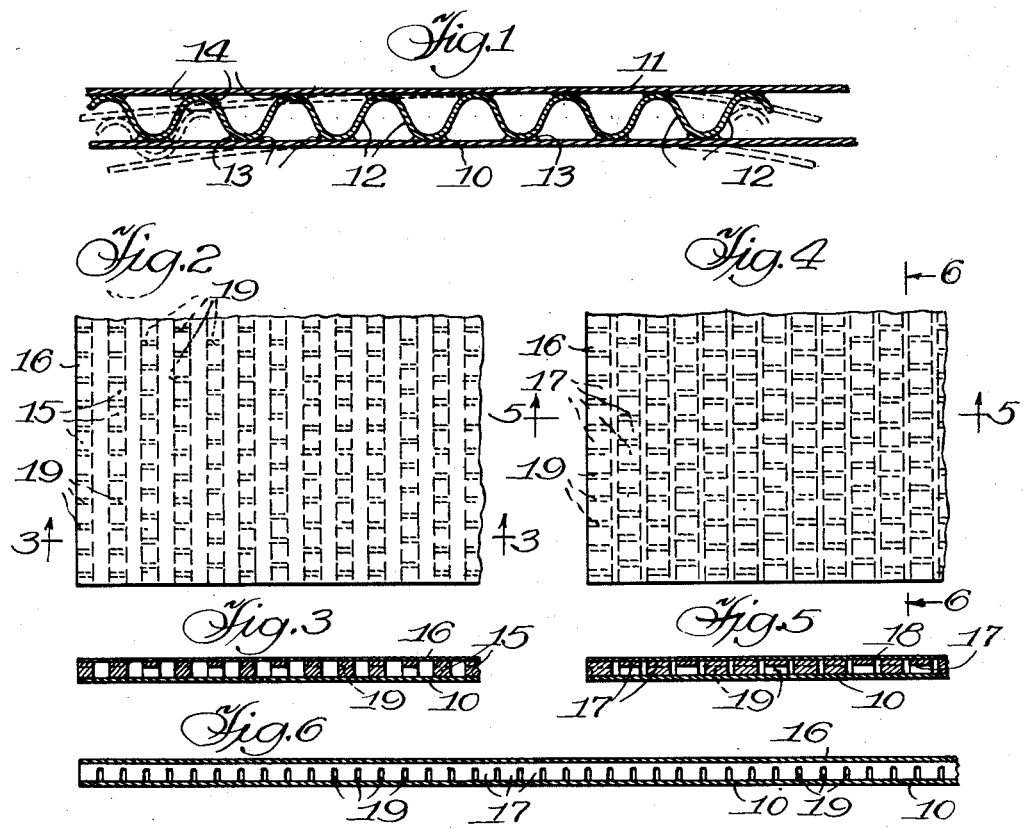
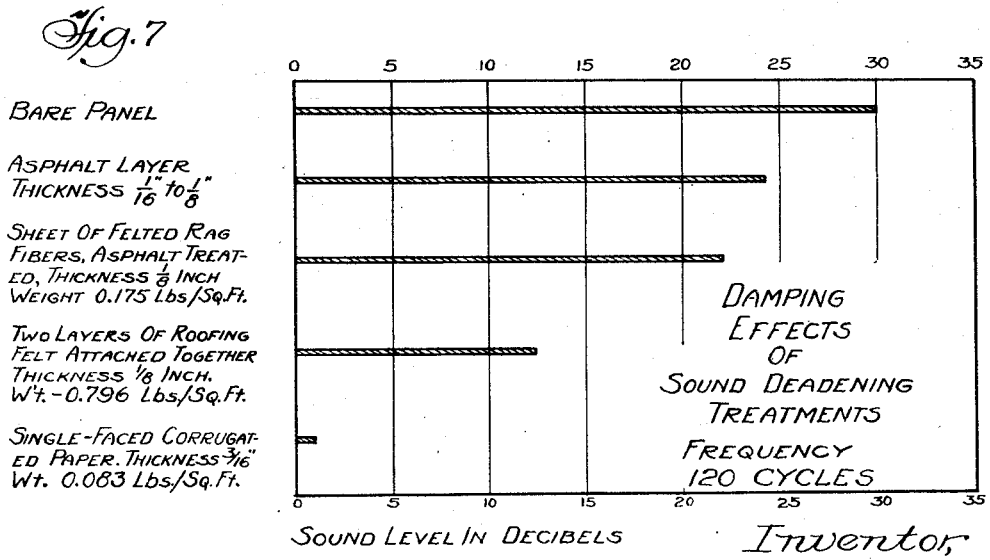
Inventor,
Ralph L. Leadbetter,
Dyrenforth, Lee, Chritton & Wiles Attys.

Feb. 2, 1937. R. L. LEADBETTER 2,069,413
SOUND AND VIBRATION DAMPING CONSTRUCTION
Filed Dec. 6, 1935 3 Sheets-Sheet 2
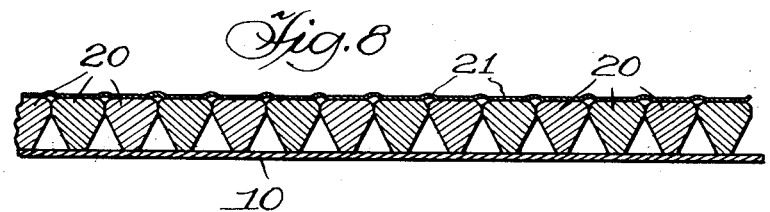
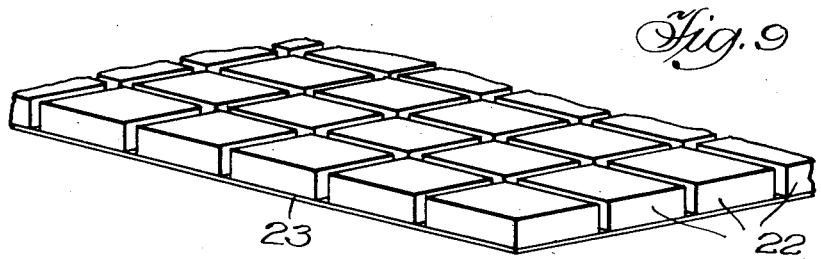
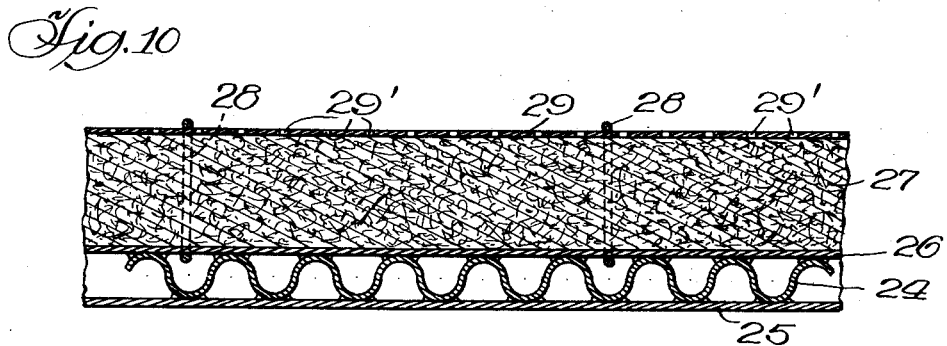
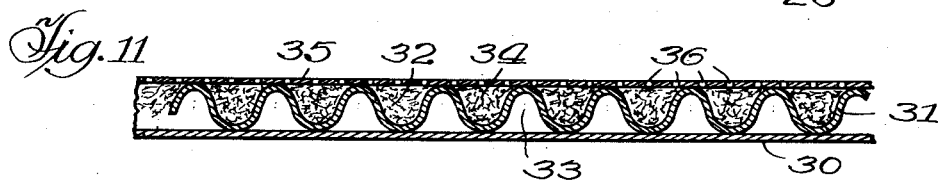
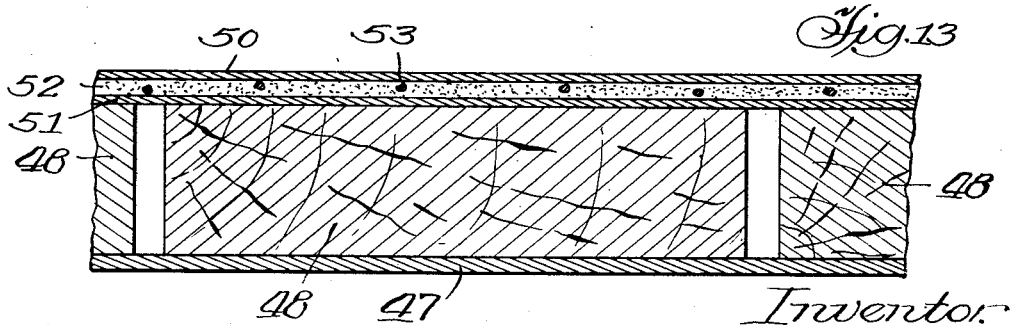
Inventor
Ralph L. Leadbetter

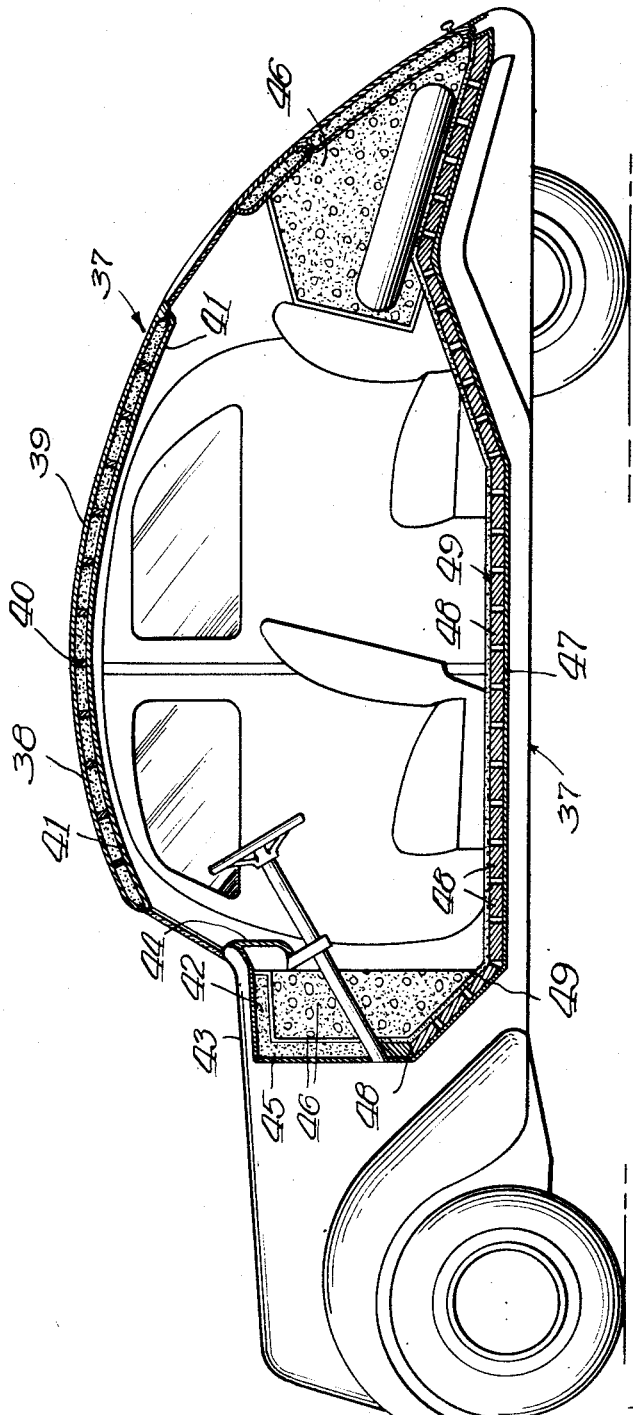

Patented Feb. 2, 1937

2,069,413

UNITED STATES PATENT OFFICE 2,069,413

SOUND AND VIBRATION DAMPING CONSTRUCTION

Ralph L. Leadbetter, Royal Oak, Mich., assignor to C. F. Burgess Laboratories, Inc., Chicago, Ill., a corporation of Delaware Application December 6, 1935, Serial No. 53,276

19 Claims. (Cl. 154—44)

This invention relates to constructions which are useful in damping the vibrations of vibratile thin bodies or panels, that is, thin bodies or panels which are inherently capable of free vibration. It relates especially to constructions which may be applied to the walls and floors of automobile bodies, railway coaches, airplane cabins and other types of vehicle bodies, for the purpose of decreasing the noises and disturbing air-throbs within such bodies when the vehicles are in operation. It may be applied to other types of enclosures, such as housings for machinery, engines and other devices which are the sources of objectionable noises and mechanical vibrations, for the purpose of decreasing such vibrations and the resulting sound outside of and in the vicinity of such enclosures.

The occupant of an automobile is subjected to noise which reaches him through the open windows, and also to motor noises and other noises which are transmitted directly through the body walls, but by far the greatest annoyance is caused by the steady drumming or rumble of the floor and walls, induced mechanically by the operation of the motor and other moving parts, and by the impacts of the wheels against road irregularities. Some of this drumming is often of low frequency, in the nature of air throbs, which are particularly disturbing. These conditions are especially true in automobiles of the so-called all-steel construction, in which the entire body and frame is constructed of steel, welded or otherwise rigidly joined together, so that shocks imparted to it at any point are transmitted undiminished to those parts which are capable of free vibration, such as the sheet-form panels of the floor and walls, and set them in vibration, with the disturbing results described above. The disturbing effects are more pronounced because of the small volume of the enclosed space and the relatively large area of reflecting surfaces.

It is the primary object of this invention to provide a treatment which is adapted for application to the walls and floors of enclosures of the nature described and which effectively suppresses the vibratory motion thereof with the result that the level of noise and air throbbing within the enclosure, and in the vicinity thereof outside, is substantially reduced.

It is a further object of the invention to provide a vibration-suppressing treatment of this character, which possesses the property of absorbing air-borne sounds within the enclosure.

It is a further object of the invention to provide a treatment of the character described, which possesses heat insulating properties for reducing heat transfer through the walls of such enclosures.

Treatments have been used heretofore for the purpose of suppressing the vibration of automobile body walls but they are effective with respect to the higher frequencies only, that is, frequencies above about 200 cycles per second. It is not difficult to suppress the higher frequencies, but the low frequency rumbles and air-throbs which causes the greatest annoyance, present a problem which has not been solved satisfactorily. The usual practice has been to apply to the walls, layers or localized masses of gummy or sticky material, composed or asphaltum, pitch, and the like. Sheets of felted materials, saturated with asphalt or other moisture-repellant substance, have also been attached to the walls. The effects of such treatments are due chiefly to the resulting addition of weight to the panels, or sections, of the walls or floor. This does not result in the suppression of vibration in the sense that the vibratory energy is dissipated, but rather effects a change in the character of vibration. The addition of the mass or weight to the panel raises its natural period of vibration. While the high frequencies are reduced, the low frequencies may be amplified and new vibrations introduced at the low end of the range which did not exist before. In other words, the vibratory energy is still present, but the frequency has been shifted to a lower range.

My improved treatment is effective in suppressing vibration throughout the entire frequency range, and is particularly effective in suppressing low frequency vibration. It effects an actual dissipation of the vibratory energy and is characterized by the provision of a member, which has strength to resist tension but not to resist compression, mounted in such relation to the wall, that vibration of the latter imposes a positive tensile stress upon said member, which tensile stress operates to suppress the vibration. The converse arrangement may also be employed, in which case the member is designed to resist compression but not tension.

In the drawings:

Fig. 1 is a transverse sectional view, on an enlarged scale, of a panel with a treatment applied thereto in accordance with this invention;

Fig. 2 is a plan of a modified form on a smaller scale;

Fig. 3 is a section on the line 3—3 of Fig. 2;

Fig. 4 is a plan of another modification;

Fig. 5 is a section on the line 5—5 of Fig. 4;

Fig. 6 is a section on the line 6—6 of Fig. 4;

Fig. 7 is a chart showing graphically the comparative results of vibration damping treatments used heretofore and a treatment in accordance with Fig. 1;

Fig. 8 is a longitudinal sectional view of a panel with a further modified treatment applied thereto;

Fig. 9 is a perspective view of a further modified treatment before it is applied to the panel;

Fig. 10 is a transverse sectional view of a treatment for absorbing air-borne sounds in addition to suppressing panel vibration;

Fig. 11 is a sectional view of a modification performing a similar function;

Fig. 12 is a sectional elevation of an automobile body with the treatment of this invention applied thereto; and Fig. 13 is an enlarged sectional view of part of the floor treatment in the preceding figure.

My treatment is adapted for convenient application to any vibratile body having appreciable surface area, such as the panels or sections of the walls and floor of an automobile body. In order to simplify the disclosure, said treatment will be described as applied to a thin, vibratile sheet or panel, and in the following description, and in the claims, the term "panel" will be understood to mean any vibratile body having a surface of appreciable area.

In Fig. 1 the panel 10 may be assumed to be sheet metal, treated with an inexpensive and effective dampening construction which comprises light-weight, single-faced corrugated paper or corrugated straw-board, in which the facing or sheet 11 is flexible. The board is applied to the panel, with the corrugations 12 in contact with said panel and the facing or sheet spaced from the panel. Another satisfactory construction is one in which the corrugations are of relatively stiff straw-board and the facing of light-weight kraft paper. Said corrugations are secured firmly to the panel 10 by means of a suitable adhesive 13, the facing 11 being attached firmly to the other side of the corrugations by means of an adhesive 14. The adhesive 13, between the panel and the corrugations, may cover and join appreciable portions of the contiguous surfaces whereby the corrugations are reinforced and form substantially rigid positioning means (and also diagonal bracing) for the facing 11, preventing any portions of the facing from being moved nearer the panel 10 and also from moving relatively to the panel in directions parallel to the surface of the panel. A double-faced corrugated paper may be used, providing the facing remote from the panel is flexible. Since the facing in contact with the panel adds a certain weight and may weaken the joint between the panel and the corrugations, such additional facing may be undesirable in some cases.

In the drawings it may be assumed that the panels are of greater length than width and that the corrugations or ribs run transversely thereof although they may run lengthwise.

The action of the structure described is believed to be substantially as follows. The vibratory motion of the panel 10 constitutes a rapid bending thereof back and forth through the plane within which it is normally at rest. Considering the sections of the panel and the sheet, in the position shown in Fig. 1, it will be understood that when the middle of the panel bends upwardly and the ends downwardly, as indicated in dotted lines, the two normally parallel sections become approximately the arcs of two concentric circles, the sheet section being the arc of the larger circle and the panel representing the smaller circle. The forces developed tend to stretch or lengthen the outer arc. In other words, the sheet section is under tension. The inner arc or panel section tends to shorten. Thus the panel is under compression. However, the spacing means 12 provides diagonal bracing for the panel and sheet and tends to hold them a fixed distance apart, being under compression. Under these conditions the sheet and the spacing means each resist effectively the stresses applied as a result of the bending tendency and there results a positive snubbing action against such bending. When the panel bends in the opposite direction the sheet is under compression but affords little resistance to the compressive force and thus undergoes a slight unnoticeable wrinkling between the points of attachment to the spacing means or corrugations 12, which latter are under compression at this time also.

Considering the vibratory characteristics under such circumstances, with respect to the half vibrations which take place when the panel and sheet are bent upwardly at the middle, i. e. when the structure is convex as viewed from above in Fig. 1, the panel is stiffer and more resilient, tending to vibrate at a higher frequency but with less amplitude. Conversely with respect to the half vibrations which take place when the structure is concave, the natural frequency is lower. This is a condition which is conductive to the rapid quenching of all vibratory motion. Mechanical shock upon the panel is followed by a vibratory response in one direction which does not find a corresponding response when it reverses its direction, with the result that the vibration quickly dies out. In other words, the vibratory motion induced by shock is damped quickly, and there is no substantal vibration maintained and augmented by successive shocks. In case there is no dampening treatment, a vibratory response in one direction is followed by a corresponding response in the other direction with the result that the vibratory motion is sustained. If similar treatments are applied to both sides of the panel, there are corresponding responses in both directions, but the snubbing or dampening action also is obtained in both directions, and, therefore, the vibrations are not sustained. It is desirable, therefore, in some cases, to treat both sides of the panel, where structural and service conditions make it possible.

If the spacing means is soft or is capable of being flexed, bent or crushed so as to permit relative movement between corresponding points upon the sheet and the panel, the snubbing effect of the treatment is reduced in proportion to the readiness with which such flexing or crushing of the spacing means takes place. Regardless of whether the above explanation is correct in all points, it is an observed fact that the sheet functions as a tension member only, i. e. it is effective as a tension member during the half vibrations in one direction, but it is not stiff enough to act as a compression member during the half vibrations in the other direction. The spacing means, however, acts always as a compression member and the stresses on both members result in a snubbing action with respect to the vibrations of the panel.

The accompanying chart, Fig. 7, illustrates the effectiveness of the treatment shown in Fig. 1, in the deadening of a vibrating panel when compared to those treatments now available on the market, or those being used for the dampening of automobile side wall panels. In each test, material such as that described above, was applied to a sheet steel panel .0375 inch thick (20 gauge). The panel was mounted in a rigid frame, leaving an area 36 inches long by 22 inches wide free to vibrate, and the said material was attached firmly to the entire vibrating area. The panel was set in vibration or driven at its center by a magnetic impulse device, the impulse rate being controllable. The noise or intensity of the drumming resulting from the vibrating of the panel was measured by a standard sound-measuring device positioned at a fixed point about two feet from the panel. In Fig. 7, the noise levels in the presence of the several treatments are represented by the lengths of the heavy horizontal lines. The highly effective character of my improved treatment applied to the standard panel is apparent by the comparative shortness of the line representing the noise level attained by its use.

In my treatment, as will be seen, the panel is not damped by weighting it appreciably, as has been the practice. On the contrary, the weight of the treatment is kept at a minimum because it is desired that the inertia of the panel be as small as possible. In addition to the corrugated board structure, any light weight thin sheet, strip, film, membrane, fabric of textile or felted material or of cellulosic material or any other form of flexible material, which possesses considerable strength to resist tension but little resistance to compression, may be attached to the panel in spaced, substantially parallel relation thereto, and in such manner that there can be substantially no relative movement between corresponding parts of said material and said panel in directions parallel or normal to the panel. Among the available suitable materials may be mentioned soft woven knitted or felted fabric which may be close mesh as in the case of cloth or open mesh as in the case of cheese cloth, scrim and the like, or it may be flexible paper, or it may be a paper reinforced with a woven fabric or with strong fibers, such as jute or hemp. It may be thin metal, such as metal foil, or thin film such as films of regenerated cellulose or of the ethers and esters of cellulose. A material which has been found to be suitable comprises two sheets of waterproof kraft paper united by means of a layer of asphalt in which layer are imbedded a plurality of long sisal fibers, extending both lengthwise and crosswise of the paper. Such material is known by the trade-name Sisalkraft. The material used should be substantially nonextensible so that it does not undergo any appreciable stretching when under tensile stress, and, as in the case of Fig. 1, will be called the "sheet" for convenience, although it may take other forms, such as strips, open-mesh fabrics, etc., as explained heretofore.

The means for spacing the sheet, which have the form of corrugations in Fig. 1, may be any light-weight material which possesses sufficient strength and rigidity to maintain corresponding parts of the panel and sheet in substantially fixed relation. Spaced strips may be used, of substantially non-compressible material, arranged preferably crosswise between the panel and the sheet. The strips may be composed of wood or compressed paper, or of a compressed wood fiber product, such as is marketed under the trademark "Masonite", or of light-weight metal, such as aluminum or magnesium.

In Figs. 2 and 3 is illustrated a modification of the invention in which spacing strips or blocks 15 of wood, pressed paper or wood fibers, or other light-weight material, are securely attached to the panel 10 on one side and to a thin, strong fabric 16 such as paper, cotton or linen fabric, on the other side. The action is the same as that explained in connection with Fig. 1.

Figs. 4 and 5 illustrate a construction similar to that shown in Figs. 2 and 3, except that the wood strips 17 between panel 10 and sheet 18 are of considerably greater width than thickness and are placed close together. Also the sheet may comprise superimposed layers of tensioning material, as for example the Sisalkraft material mentioned heretofore, having reinforcing strands therein extending both lengthwise and crosswise. This particular construction, which is shown on a larger scale in Fig. 13 has been found to be mechanically strong and to be very effective for damping panel vibration.

If the strips possess resilience, as is the case with wood strips, so that they tend to vibrate with the panel, they may be cut or slotted crosswise at close intervals, in order to reduce their resilience. Stiffness without resilience is not objectionable, however, and strips of the Masonite material mentioned heretofore, which have these properties, provide an effective spacing means. Fig. 6 shows a transverse section through Fig. 4, in which the spacing strips 17, are provided with such slots 19, extending crosswise of the strips. The slots reduce the resilience of said strips and may be used in the structure of Figs. 2 and 3 also, as indicated by the same reference character.

In Fig. 8, a series of blocks or strips 20 are attached to the panel 10 and may have a length equal to the corresponding dimension of the panel. Said blocks each have a tapered portion which may be considered the spacer. The upper, wider parts collectively constitute a compression member, acting in a capacity equivalent to that of the sheet of the other forms, and they also may be assembled with a strip of cloth 21 to hold them loosely together. Their parallel side faces are arranged to be in contact with each other when the panel is in the normal, at-rest position. When the panel bends in one direction said faces move apart and there is no resistance offered to the bending action. When the panel bends in the opposite direction the blocks are pressed together and resistance is offered to the bending action. This construction, like those previously described, creates a positive resistance to the bending of the panel in one direction.

Fig. 9 illustrates a construction in which relatively closely spaced rectangular blocks 22 are attached to the sheet 23, in longitudinal and transverse rows, the assembly being ready for application to a panel. In any of the treatments employing strips or blocks, said strips or blocks may be attached to the sheet at the factory and the assembly transported to the point at which the treatment is to be applied to the panel, for instance, an automobile plant.

In general, referring to all the treatments described, the combined weight of the sheet and the spacing means should be kept at a minimum, as previously stated, for the reason that the panel and the treatment move as a unit, and if the weight of the treatment is increased, the mass of the system may reach the point where the inertia of the parts while in motion, is sufficient to overcome the snubbing action, in which case the damping effect may be impaired or annulled.

The sheet should not be stiff or resilient for the reason that otherwise it may be inherently capable of vibrating in a frequency range at or near that of the resilient panel, in which case the sheet and the panel may form a vibratile system capable of sustained vibration even in the presence of the spacing means. A stiff sheet possesses strength to resist compression and such a sheet would render ineffective the character of action, described heretofore, which creates a positive resistance to the bending of the panel in one direction only. A flexible sheet is preferred, examples of which have been set forth heretofore.

The spacing means may take different shapes from those illustrated. For instance, the corrugations of Fig. 1 may be rectangular. The spacer may be a paper fabric of cellular, honeycomb or eggcrate arrangement or it may be "waffled" paper, or assume some other form.

The treatment, comprising the sheet and the spacing means, may be applied as a unit to the entire surface of the panel, or it may be applied to a portion only of the area of panel, i. e. to the portion which accomplishes the acoustic effect desired. Panels do not vibrate entirely as a unit, this being especially true as the panels increase in size. Under some conditions certain portions of the panel vibrate more violently than others. This may be due to the way in which the panel is mounted, to the shape of the panel, or to other factors. The treatment may be divided into strips or bands, with the spacing members, such as the corrugations of Fig. 1, or the strips of Figs. 3 and 5, extending crosswise of the long dimension of the band. The treatment may also be applied in the form of a plurality of bands spaced apart from each other. The permissible spacing can be determined by experiment with each different type of panel, or type of treatment The spacing means may be of varying height and the individual spacing members, such for example as the strips of Fig. 3, may be spaced varying distances apart. Ordinarily, increasing the distance between spacing members results in reduced effectiveness, but this may be compensated for by increasing the height of the spacing members. However, it is possible to increase the distance between spacing members to such an extent that portions of the panel between the spacing members are capable of vibrating as individual panels, and such a condition should be avoided for best results. The permissible and desirable variations must be determined for each particular application because of the different vibratory characteristics which are encountered in panels of different shapes, sizes, thicknesses and materials. However, it is usually desirable to maintain the space occupied by the treatment at a minimum, as well as the weight thereof, and to maintain its strength to resist handling, being walked upon, etc., at a maximum. With these requirements in mind, it has been found that spacing members from ⅛ to ¼ inch in height and spaced from 3/32 to ¼ inch apart, are satisfactory in most cases.

My improved treatment is adapted to be applied not only to flat panels as shown, but also to curved panels and when reference is made in the specification and claims to the normal, at-rest position of the panel it is contemplated that this includes the at-rest positions of panels which are curved. The articulated character of the treatment adapts it very well to curved surfaces, particularly to cylindrical surfaces. Also it is obvious that it is immaterial from an operation standpoint, on which surface of a vibratile panel or sheet the damping construction is placed. However, other considerations usually determine the placement. It should be placed, for example, on the interior of a side wall of an automobile, although when it is applied to the floor panels, it may be placed on the outside if desired. Unless otherwise limited, the claims are intended to cover the treatment either of an inside or outside surface, or both. The particular materials which are used should be chosen with respect to the conditions to which they are subjected when in use. For example, under certain conditions, moisture-resistant and/or fire-resistant materials should be used.

Where it is desired, not only to suppress the vibrations of the panel, but also to absorb and reduce the air-borne noises originating within or without the enclosure, a treatment such as shown in Fig. 10 may be employed. A corrugated member 24 is firmly attached to the panel 25, as before, and the facing sheet 26 is similarly attached to the other side of the corrugations or ribs. On said facing sheet, is mounted a layer of lightweight, porous sound-absorbing material, which may be composed of a pad 27 of wood fiber, such as is marketed under the trade-mark Balsam Wool, or of matted hair, kapok, cotton, etc., suitable for the purpose. As a specific example, Balsam Wool pads one inch thick and weighing about 0.15 to 0.35 pound per square foot are satisfactory. It is preferably attached to the sheet 26 by stitching or stapling 28. An adhesive may be used, provided that it does not harden or stiffen said sheet and increase its strength to resist compression to such an extent as to reduce its effectiveness for suppressing vibration. The sound-absorbing layer 27 may be covered with a suitable, sound-transparent finishing sheet 29, which may be an open mesh woven fabric, for example, cheese cloth, or a perforated sheet such as described in Norris United States Patent No. 1,726,500. The perforations are indicated at 29'. The air-borne noises encountered in automobiles and other vehicles usually are of a relatively high frequency, and are absorbed effectively by such lightweight, porous sound-absorbing materials. The treatment shown in Fig. 10 also functions to insulate the panel 25 against the transfer of heat from one side to the other. The porous sound-absorbing material is an effective heat insulator and the dead air spaces on both sides of the sheet of corrugated paper function also to insulate against heat transfer.

In Fig. 11 a structure is shown in which the sound-absorbing material is incorporated in the panel vibration damping construction, instead of being supplemental to it. The panel 30 has attached to it the corrugated member 31, this member being so corrugated that the spaces or grooves 32 on the upper side are larger than the grooves 33 on the lower side. The grooves 32 are filled with a light-weight porous, fluffy sound-absorbing material 34, as shown. The light-weight flexible sheet 35, perforated as indicated at 36, is attached to the tops of the corrugations as described previously. Said perforations permit sounds incident to the exposed surface of sheet 35 to pass through the latter and be absorbed in the absorber contained in said grooves. It is possible to use for the sheet a web of paper of sufficient porosity to avoid the necessity for formed perforations. The grooves 33 may also contain sound-absorbing material, provided corrugated member 31 is perforated. Sound-absorbing material also may be incorporated in the other treatments described heretofore. For instance, in the treatment shown in Fig. 3, sheet 16 may be perforated, and the spaces between strips 15 may be filled with soft, porous sound-absorbing material. In these treatments, also, the sound-absorbing material functions as a heat insulator.

Fig. 12 illustrates an automobile body 37 having an effective silencing treatment in accordance with this invention. A layer of sound-absorbing material 38 is attached to the under side of the top wall 39, between the transverse strips 40. The usual decorative fabric lining 41 is attached to said strips 40 and conceals the sound-absorbing installation. Additional sound-absorbing material 42 may be placed upon the interior surfaces of the cowl 43 forward of the dash 44 and upon the interior surface of the bulkhead 45 between the body and the motor compartment. The sound-absorbing material may be covered with a perforated sheet facing 46. This treatment, comprising the sound absorbing material and the perforated facing, absorbs motor noises which would otherwise pass through bulkhead 45. A similar treatment is applied also to the side walls of the spare tire compartment, at the rear.

To the floor 47 of the body, there is attached a damping treatment comprising spacing members 48 and a flexible sheet 49, which may be similar to the construction illustrated in Fig. 5, and which is shown in more complete detail on an enlarged scale in Fig. 13, in which the metal floor 47 constitutes the panel and in which the spacing members 48 are preferably strips of wood of about the proportions shown. The flexible sheet is made up of an upper and a lower layer 50 and 51 of kraft paper with a layer 52 of asphalt between them. Sisal fibers 53 are imbedded in the asphalt, said fibers extending both lengthwise and crosswise of the paper.

The combination of the sound-absorbing material and the treatment for damping the vibratory motion of the floor provides a means for reducing the total noise level in the automobile to a minimum. The porous sound-absorbing material acts also as a heat insulator for reducing heat transfer through the walls and roof of the automobile body.

The terms "upper", "lower", "outer", "inner", and similar terms are used herein in a relative sense for the purpose of simplifying the description and are not intended necessarily as limitations, as will be evident. In addition to the several modifications referred to it will be apparent that various changes may be made in the form and material of the various parts and in the relative arrangement thereof, without departing from the spirit of the invention.

I claim:

1. Means for suppressing the vibrations of panels, comprising a plurality of members secured to a side of said panel and being distributed over a substantial portion of the area of said panel, said members projecting laterally from said panel and being substantially non-yielding in their relation to said panel, whereby bending of said panel in one direction tends to spread apart the portions of said members remote from said panel and bending of said panel in the opposite direction tends to move said remote portions closer together, and means on said remote portions for substantially preventing one of said changes in the relative positions of said remote portions but not the other.

2. Means for suppressing the vibratory motion of a vibratile panel, comprising a member in spaced relation to said panel and coextensive with a substantial portion of the area of said panel, and means for maintaining said member substantially fixed in said spaced relation, whereby bending of said panel in one direction tends to expand said member in certain directions and bending of said panel in the opposite direction tends to contract said member, said member yielding freely to one of said changes of its dimensions but being substantially non-yielding to the other.

3. Means for suppressing the vibratory motion of a vibratile panel, comprising a member in spaced, substantially parallel relation to said panel and coextensive with a substantial portion of the area of said panel, and means for maintaining said member substantially fixed in said spaced relation, whereby bending of said panel in one direction tends to expand said member in directions substantially parallel to said panel and bending of said panel in the opposite direction tends to contract said member in directions substantially parallel to said panel, said member being flexible and non-extensible whereby it yields readily with respect to contraction but is substantially non-yielding with respect to expansion.

4. Means for suppressing the vibratory motion of a vibratile panel, comprising a thin, lightweight, substantially non-extensible fabric, coextensive with a substantial portion of the area of said panel and being spaced from said panel, and a plurality of distributed light-weight spacing members between said panel and said fabric and firmly attached thereto, said members possessing sufficient rigidity to maintain said fabric and panel in substantially fixed spaced relation.

5. Means for suppressing the vibratory motion of a vibratile panel, comprising a flexible, substantially non-extensible sheet, in spaced, substantially parallel relation to one side of said panel, and means for maintaining said sheet in substantially fixed spaced relation to said panel, said spacing means being firmly attached to said panel and said sheet at a plurality of distributed points upon the areas of each and being substantially non-yielding as arranged on said panel.

6. Means for suppressing the vibratory motion of a vibratile panel, comprising a thin, lightweight, substantially non-extensible fabric, spaced from said panel and coextensive with a substantial portion of the area of said panel, and spacing means for holding said panel and said fabric apart, comprising a relatively stiff corrugated sheet, the corrugations of said sheet being firmly attached to said panel and said fabric and being substantially non-yielding in their arrangement on said panel.

7. The vibration suppressing means of the preceding claim, in which the spacing means is a corrugated sheet of relatively stiff paper, the corrugations being substantially non-compressible.

8. Means for suppressing the vibratory motion of a vibratile panel, comprising a member in spaced relation to said panel and coextensive with a substantial portion of the area of said panel, and means for maintaining said member substantially fixed in said spaced relation to said panel, whereby bending of said panel in one direction tends to put said member under tension and bending of said panel in the opposite direction tends to put said member under compression, said member yielding freely to the forces of compression but being substantially non-yielding with respect to the forces of tension.

9. In combination with a vibratile panel, a vibration-damping construction comprising intermittent, light-weight, spacing means attached to a surface of said panel and covering the major portion of a designated area thereof, said spacing means being substantially non-yielding in its arrangement on said panel and light-weight, flexible, sheet means attached at intervals throughout its area to said spacing means, said spacing means and sheet means being so arranged that said panel is rendered substantially non-vibratile.

10. Means for suppressing the vibrations of panels, comprising a plurality of closely spaced members having their inner portions secured to the side of said panel and projecting laterally therefrom, and being in substantially non-yielding relation to said panel, the outer portions of said members being in mutually contacting relation when said panel is in the normal, at-rest position, whereby bending of said panel in one direction from said at-rest position causes separation of the outer portions of said members and bending in the opposite direction causes said members to come into mutually compressive engagement.

11. Means for suppressing the vibratory motion of a vibratile panel, comprising a member in spaced, substantially parallel relation to said panel and coextensive with a substantial portion of the area of said panel, and means for maintaining said member substantially fixed in said spaced relation, whereby bending of said panel in one direction tends to expand said member in directions substantially parallel to said panel and bending of said panel in the opposite direction tends to contract said member in directions substantially parallel to said panel, said member yielding freely with respect to expansion but being substantially non-yielding with respect to contraction.

12. In combination with a vibratile panel, a vibration-damping construction of relatively light weight, comprising a faced corrugated paper, the facing thereof comprising light-weight, flexible material, said corrugated paper being arranged with the corrugations attached to said panel and the facing exposed, said corrugations being substantially non-yielding in their arrangement on said panel, whereby said panel is rendered substantially non-vibratile.

13. A sound and vibration damping construction for a vibratile panel, comprising the combination of intermittent, light-weight, spacing means attached to a surface of said panel, flexible sheet means in contact with said spacing means and attached thereto throughout substantially the areas of contact, whereby said panel is rendered substantially non-vibratile, and light-weight sound-absorbing means mounted contiguous to said sheet means.

14. In combination with a vibratile panel, light-weight intermittent spacing means attached to a surface thereof and forming a series of pockets or grooves, sound-absorbing material in said pockets, and flexible sheet means, attached at such points over its area to said spacing means, that vibrations of said panel are substantially damped, said sheet means containing openings therethrough whereby sound incident to the exterior surface thereof may be absorbed by said sound absorbing material.

15. An article of manufacture for acoustical treatment, comprising a thin, flexible, substantially nonextensible sheet, having a plurality of spaced strips of substantially non-compressible material attached to one surface thereof.

16. In combination with a sheet metal panel of an automobile body and the like, a vibration-damping construction comprising stiff, light-weight, spacing means attached to a surface of said panel and light-weight flexible sheet means attached substantially throughout its area to said spacing means, said spacing means and sheet means being so arranged that the drumming normally caused by said panel in the interior of said body in the absence of said treatment, is substantially lessened.

17. In combination with a sheet metal panel of an automobile body and the like, a vibration-damping construction comprising distributed, stiff, spacing members adhesively attached to the interior surface of said panel, a flexible sheet adhesively attached to and covering said spacing members, and longitudinal and transverse tension members reinforcing said sheet, said spacing members and sheet being so arranged that the drumming normally caused by said panel in the interior of said body in the absence of said treatment, is substantially lessened.

18. The combination with an automobile body having a sheet metal floor, of a vibration-damping construction comprising wooden slats attached to the body floor, a sheet of kraft paper covering and secured to said slats, a layer of asphalt adhering to the upper side of said paper and having fibrous reinforcing members imbedded therein, running at different angles, a second sheet of kraft paper adhering to the upper side of said asphalt layer, the superimposed layers of paper and reinforcing material acting as a unit under tension, to resist bending of said sheet metal floor upwardly in certain areas during half-periods of vibration, but relaxing during the opposite half-periods of vibration, whereby the noise is substantially reduced.

19. An acoustically treated vehicle body comprising in combination, a plurality of enclosing walls subject to vibration or noise, a layer of sound absorbing material attached to the interior surface of at least a portion of said walls, distributed stiff spacing means attached to at least a portion of said walls, and a thin flexible body having substantial tensile strength attached to said spacing means, said spacing means and said thin body being so arranged as to damp the vibrations of the wall portions to which they are attached.

RALPH L. LEADBETTER.